March 12, 1935. Z. H. KEVORKIAN 1,993,934
APPARATUS FOR PRODUCTION OF COKE AND RECOVERY OF BY-PRODUCTS THEREFROM
Filed Sept. 4, 1930 6 Sheets-Sheet 1
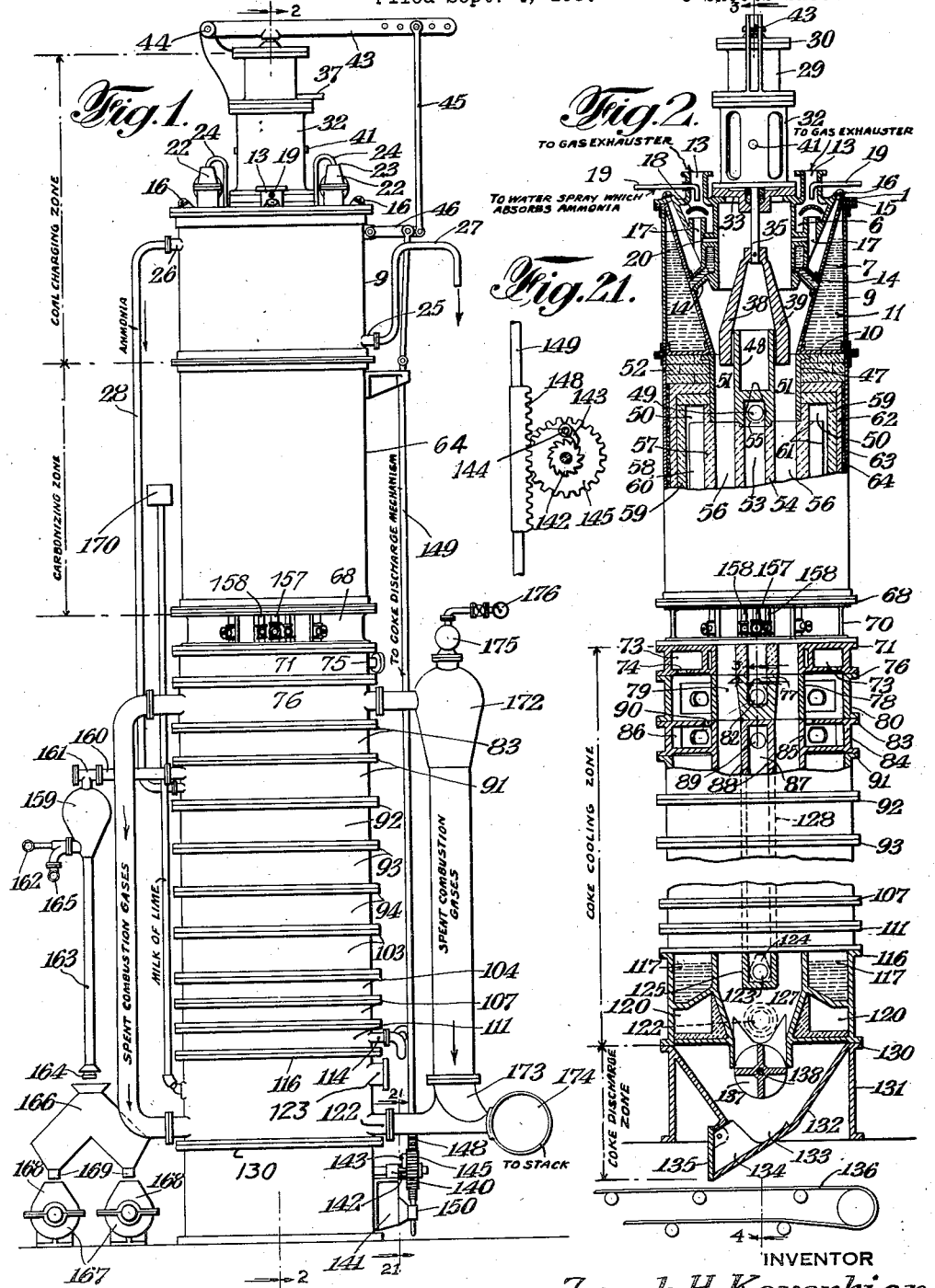
INVENTOR
Zareh H. Kevorkian
BY
ATTORNEYS

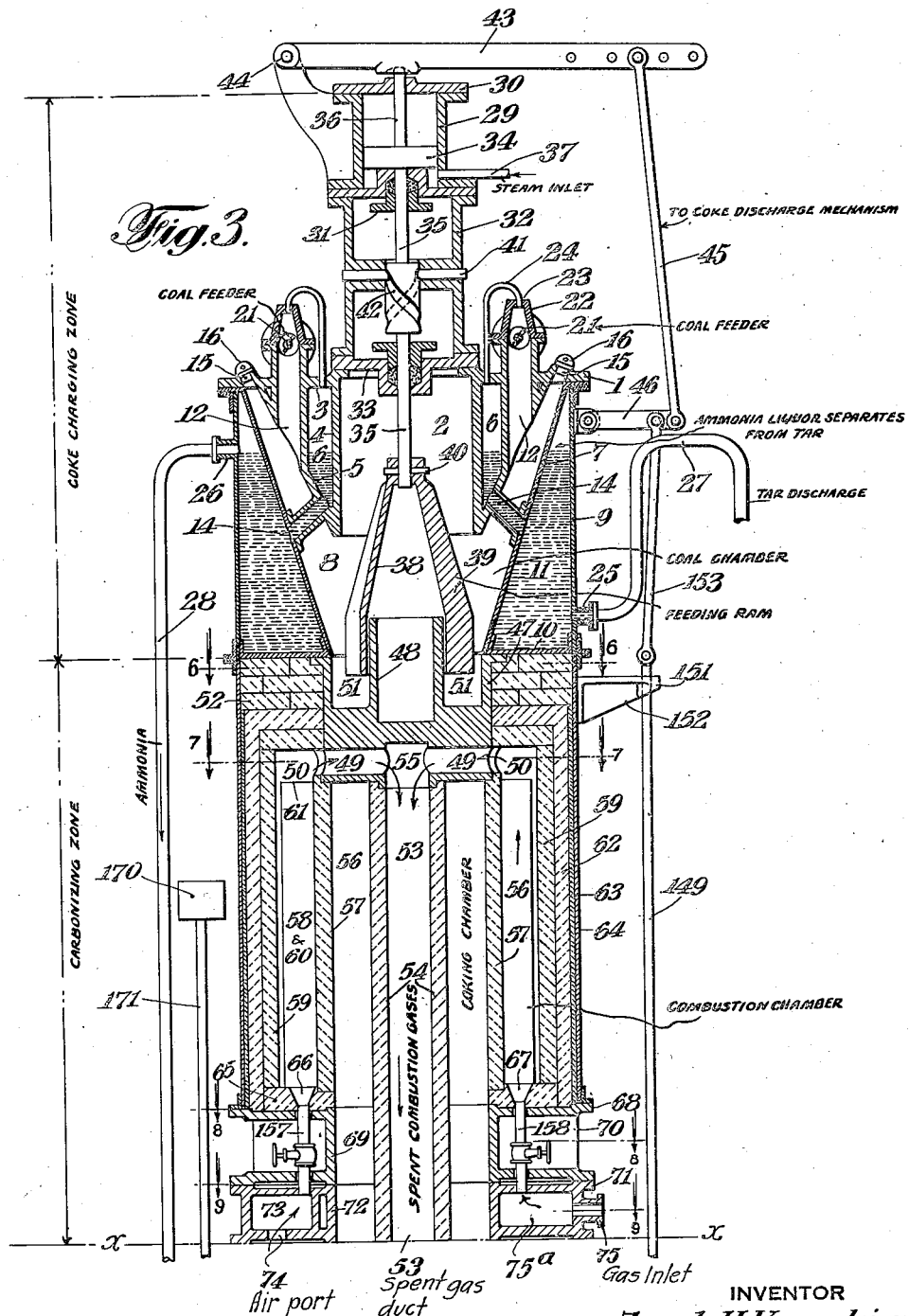

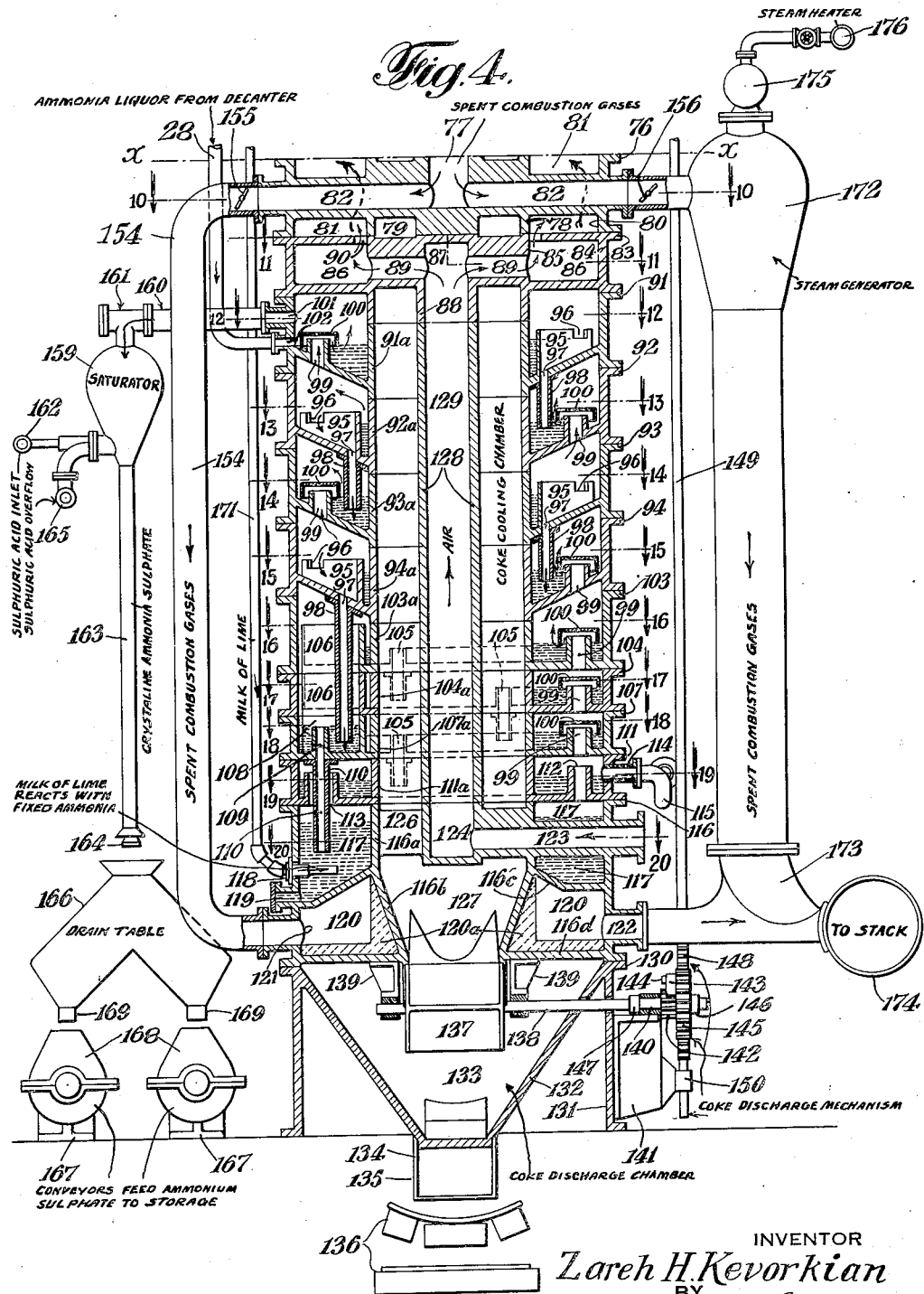

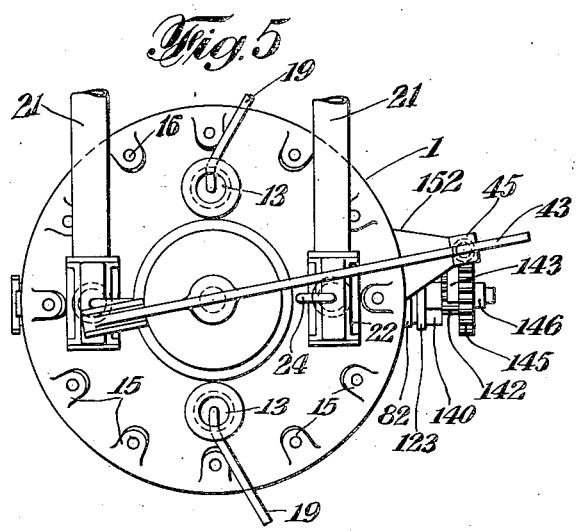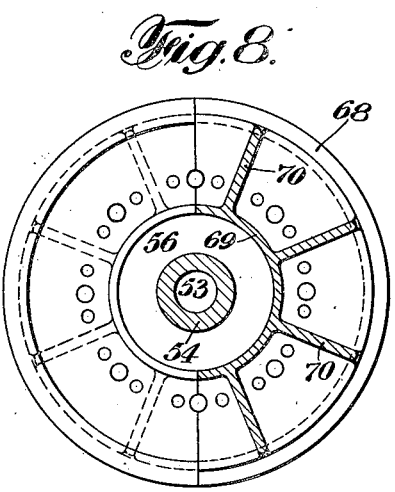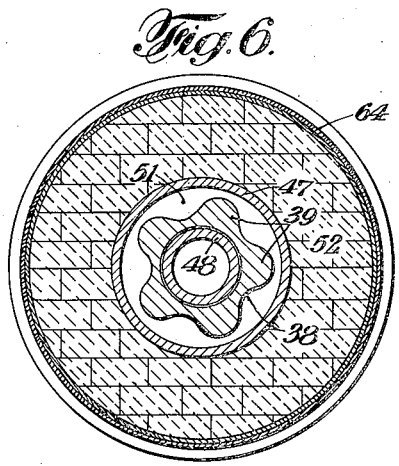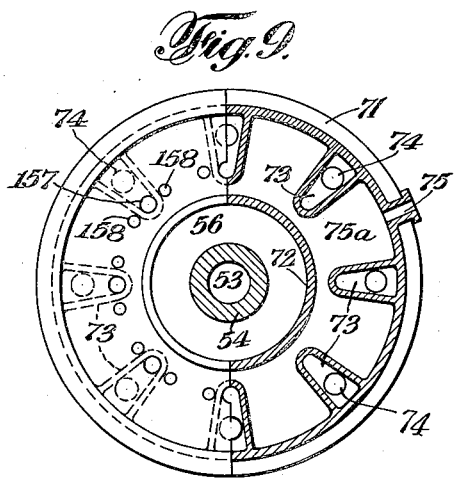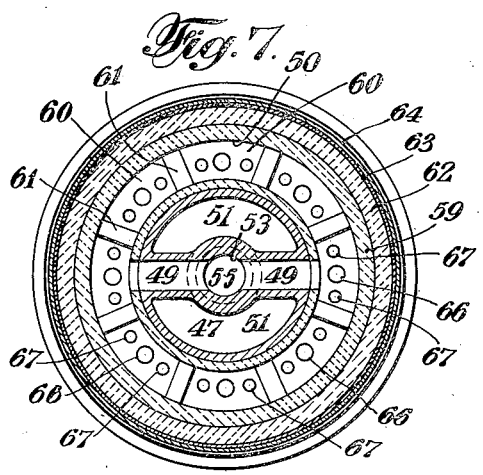

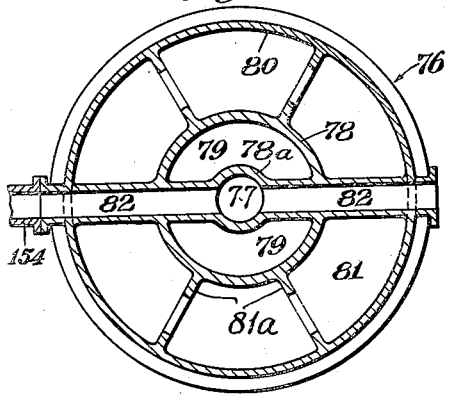
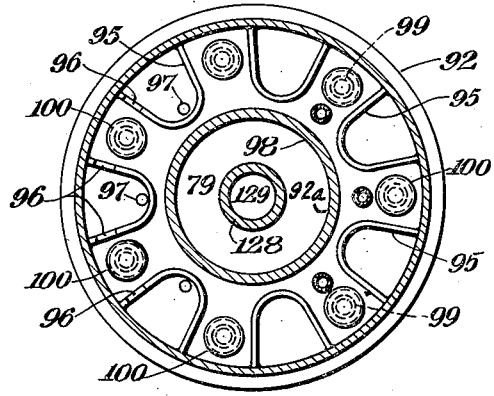
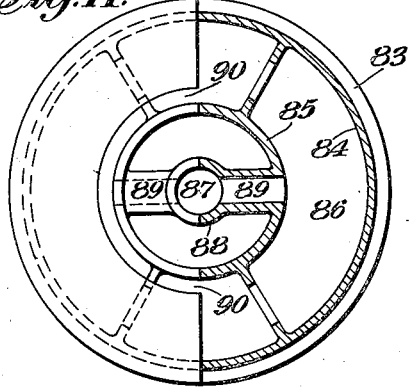
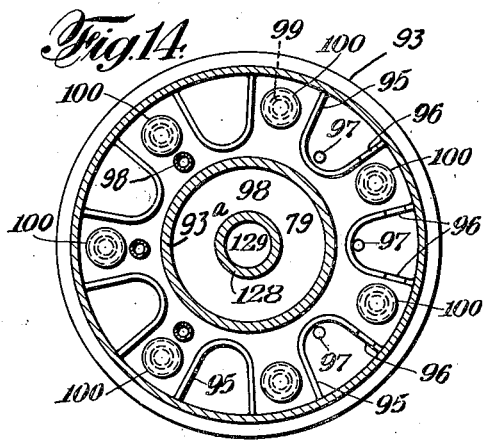
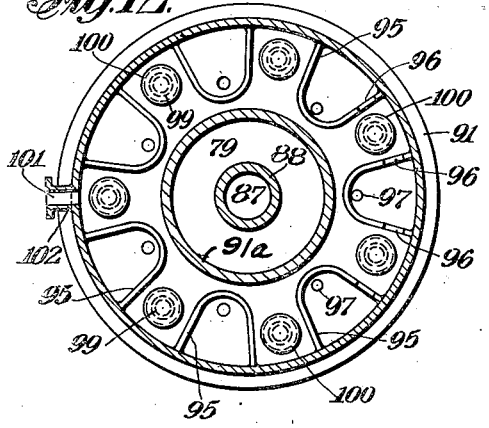
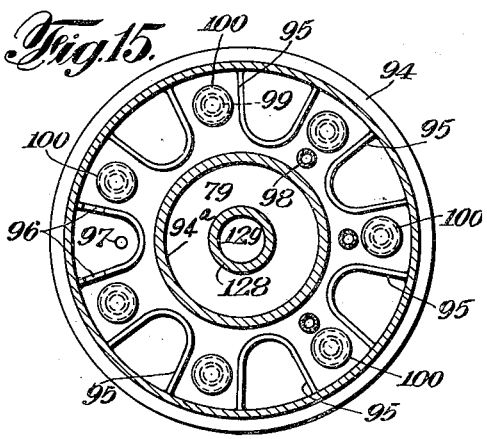

March 12, 1935.  Z. H. KEVORKIAN  1,993,934
APPARATUS FOR PRODUCTION OF COKE AND RECOVERY OF BY-PRODUCTS THEREFROM
Filed Sept. 4, 1930  6 Sheets-Sheet 6
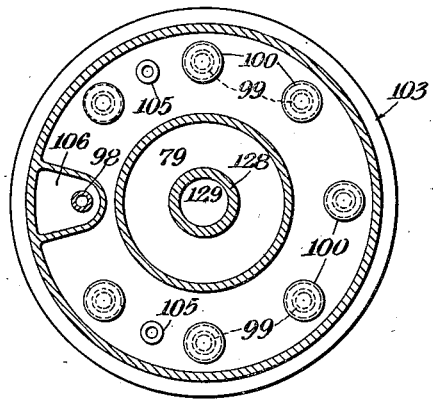
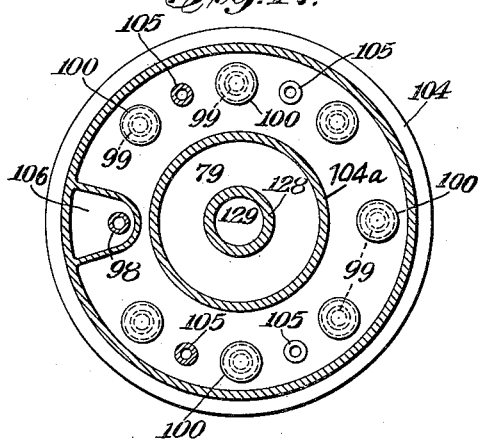
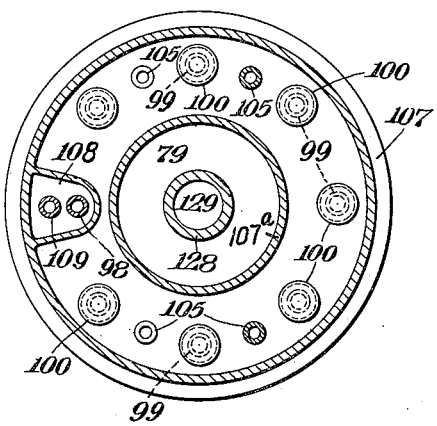
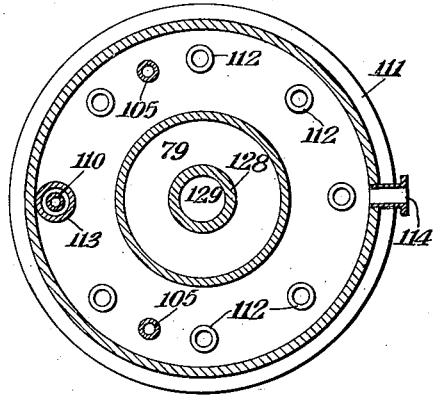
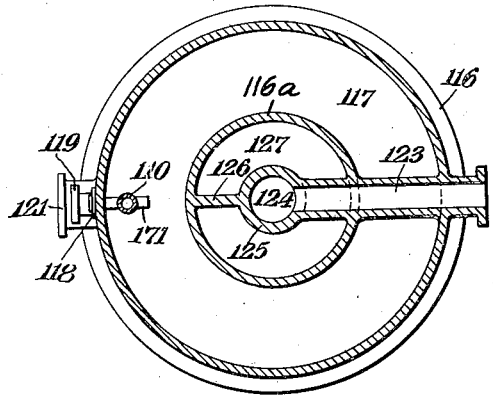
INVENTOR
Zareh H. Kevorkian
BY
ATTORNEYS Patented Mar. 12, 1935

1,993,934

UNITED STATES PATENT OFFICE 1,993,934

APPARATUS FOR PRODUCTION OF COKE AND RECOVERY OF BY-PRODUCTS THEREFROM

Zareh H. Kevorkian, Fairfield, Ala.

Application September 4, 1930, Serial No. 479,742

2 Claims. (Cl. 202—84)

This invention relates to an improved apparatus for the production of coke and the recovery of by products.

Heretofore the general practice for making coke included the steps of charging coal to horizontal retorts of coke ovens having combustion flues adjacent thereto. Such retorts are usually built in batteries and are charged from a car carried on overhead tracks. The usual coke ovens are provided with doors which are moved at regular intervals to permit the incandescent coke to be discharged by a suitable ram carried by a so-called coke pusher machine. In usual practice, this coke is very hot or in an incandescent state and in order to be handled it is usually transported in special cars to a coke quenching station where water is sprayed thereon to cool the material. Such a coke quenching operation is wasteful and expensive due to loss of heat and cost of water and necessitates a crew, who are obliged to work in an unhealthy environment of hot steam or gases resulting from the quenching operation. Moreover, the pushing equipment in usual practice is expensive and the interest on such an investment and the cost of operating such equipment enters very considerably into the cost of coke.

My invention overcomes the above and other disadvantages of prior practice and enables a substantially complete utilization of the heat units of the fuel supplied for the carbonization or coking of the coal.

As will hereinafter more fully appear, the apparatus disclosed eliminates the usual pushing and wet quenching operations and enables me to utilize the available heat of the incandescent coke to heat fuel gas and air as well as the liquor produced that contains ammonia as a by-product. Thus, the coke is cooled while the fuel, air and by-product liquors are heated thereby utilizing heat units which are usually wasted in the ordinary wet quenching operations heretofore used.

My improved apparatus will be fully apparent from the following specification when read in connection with the accompanying drawings and will be pointed out with particularity in the appended claims.

In the drawings:—

Fig. 1 is an elevation of a by-product coke oven adapted for carrying out the improved method and embodying features of the invention;

Fig. 2 is a view partly in elevation and partly in section on line 2—2 of Fig. 1;

Fig. 3 is an enlarged vertical longitudinal section of the upper half of Fig. 2, the section being taken on line 3—3 thereof;

Fig. 4 is a similar section of the lower half of Fig. 2, the view being taken on line 4—4 thereof. Figs. 3 and 4 when joined on the line $x$—$x$ give a complete longitudinal vertical section of the apparatus;

Fig. 5 is a top plan of Fig. 3;

Figs. 6 to 20 inclusive are horizontal views some with parts shown in elevation taken on correspondingly numbered section lines of Figs. 3 and 4;

Fig. 21 is a detail view taken on line 21—21 of Fig. 1.

In making coke according to this invention, I supply coal to an upper chamber by means of suitable feeders. This coal is preferably forced downwardly into a vertical retort chamber which is heated by the products of combustion surrounding the retort. The spent products of combustion are caused to pass downwardly through a duct extending through the coking retort and the heat thereof is utilized in a manner which will hereinafter appear. The coke produced in the retort is fed to a cooling chamber forming an extension of retort. In this chamber the coke gives up part of its heat to combustion air and fuel which is fed to the combustion chamber for heating the retort.

The gases and other volatile products given off by the coal during the coking thereof are subjected to the action of a stream or spray of water which is adapted to absorb the ammonia and condense the tar in the gases, after which the remaining gases are withdrawn by suction. The enriched liquor mingled with condensed tar is collected in a decanter in which they stratify due to their different specific gravities. The ammonia enriched liquor is led from the decanter into heat exchanging relationship with the coke within the cooling chamber. This liquor of course being isolated from the coke. The liquor is circulated in separate stages around the coke cooling chamber and thereby absorbs a very material percentage of the heat of the coke. At the same time, the ammonia gases are distilled off from the liquor. These gases are led to suitable treating apparatus such as a saturator or the like where they are mixed with sulphuric acid and form crystalline ammonium sulphate. This product is allowed to accumulate in a suitable reservoir and from time to time is discharged to the drain table wherein the excess liquor is recovered. From the drain table the product is fed to screw conveyors which carry the same to suitable storage containers. A small quantity of ammonia vapor produced is fed to the conveyor apparatus to neutralize any acid remaining in the ammonium sulphate after it passes the drain table. The conveyors are steam jacketed so as to dry the sulphate as it progresses toward the storage vessels.

A full and complete understanding of the various steps in the operation of my improved apparatus may be had from the following detailed description when read in connection with the accompanying drawings.

I will first describe the structural features and general arrangement of the apparatus and then give a specific example of the operation of the same.

A flanged substantially cone-shaped member 1 at the top of the apparatus includes walls 3, 4 and 5 forming an open central chamber 2 and enclosed chamber 6. This member is surrounded by substantially conical ring 7 forming a coal feeding chamber 8 which is open at the bottom so as to permit the discharge of coal therefrom into a coking retort hereinafter referred to.

A cylindrical shell 9 surrounds the ring 7 and is secured to a bottom plate 10 by suitable flanges and angles as shown. The closed chamber 11 constitutes a decanter adapted to hold ammonia liquor and condensed tar.

The member 1 has formed therein ducts 12—12 which communicate with the coal chamber 8. These ducts also communicate at the top with housings which enclose screw conveyors 21—21 adapted for feeding coal to the coal chamber.

The member 1 is also provided with flanged outlet pipes 13 adapted to be connected with gas exhausters not shown. Poking holes 15 normally closed by plugs 16 open into the coal chamber as indicated in Fig. 3. Ducts 17 are provided to permit the escape of volatile gases from the coal chamber 8 into the chamber 6 of the member 1. The escaping gases or vapor from the ducts 17 are adapted to be sprayed by jets of water discharged from pipes 19. The outlet ends of these pipes terminate in spaced relationship to curved baffle discs 18 which serve to thoroughly intermix the gas and water so that the latter has ample opportunity to absorb products such as ammonia or the like therefrom. The gas ducts 17 communicate with the chamber 2 by means of transverse ducts 20 as shown in Fig. 2. As thus arranged, it is clear that the volatile products distilled off from the coal fed to the chamber 8 will be passed upwardly through the ducts 17 and will have sprays of water impinged thereon which will absorb or condense certain of the gaseous products. The enriched liquor flows through pipes 14 to the decanter chamber 11.

Gases arising from the chamber 8 through the ducts 12 are adapted to be caught in caps 22 surrounding the conveyors 21. These gases pass by way of pipes 24 secured at 23 to the chamber 6.

Decanter shell 9 is provided with flanged outlets 25 and 26. Outlet 25 has connected therewith pipe 27 adapted for the periodical removal of tar settling in the bottom of the decanter. The outlet 26 is connected with a pipe 28 adapted to lead ammonia liquor from the upper part of the decanter to certain heat exchanging apparatus hereinafter referred to.

A cylinder 29 having a head 30 and suitable gland 31 and a supporting bracket 32 is supported from a base plate 33 secured to the top member 1. A piston 34 having a rod 35 operates within the cylinder. The piston carries a spindle 36 which coacts with a lever 43 pivoted at 44. The lever 43 is connected by a link 45 with a lever 46 which is adapted to be rocked upon reciprocation of the piston so as to actuate coke delivery mechanism hereinafter referred to.

A coal feeding ram 38 provided with fins 39 is connected by means of a pin 40 with the rod 35. This piston rod carries a grooved member 42 which cooperates with pins 41 secured to the bracket 32 so, as the feeding ram 38 is reciprocated, a turning motion is simultaneously imparted thereto.

A member 47 secured to the plate 10 is formed with a cylindrical extension 48 which serves as a guide for the ram 38. The member 47 is shaped in cross section to provide an annular chamber 51 through which the coal travels on its way to the coking retort chamber 56 directly below. The retort chamber is enclosed by a brick wall 57 which is also common to a combustion chamber 58 surrounding the wall 57. The outer part of this combustion chamber is formed by a circular wall 59. Preferably the combustion chamber is divided up into a plurality of separate compartments by means of radial division walls 61, thus forming a plurality of combustion flues 60. The combustion chamber is closed at the top by a horizontal brick wall 52.

Extending through the coking retort is a gas duct 54 having a passage 53 therein opening into a chamber 55 communicating with lateral branch passages 49 which in turn open into the annular space 50 at the top of the combustion chamber. The wall 59 of the combustion chamber is preferably formed of a highly refractory material. Outside of this there is a wall 62 of brick or similar refractory material. This is covered with a layer 63 of heat insulating material which in turn is enclosed by a cylindrical steel shell 64.

A metal oven section 68 (Figs. 3 and 8) serves as a foundation for the coking retort. This section is usually made of cast metal and includes a cylindrical chambered portion 69 forming an extension of the coking chamber and also radial ribs 70. The pockets between the ribs corresponding in number to the vertical flues 60. The top and bottom flanges of the section 68 have holes formed therein which register with openings 66 and 67 formed in the bottom wall 65 of the combustion chamber.

An oven section 71 (Figs. 3 and 9) includes top and bottom flanges as shown and an inner cylindrical wall 72 aligned with the walls 57 and 69 of the coking chamber and section 68. This section 71 is provided with a plurality of pockets 73. The number of pockets corresponding to the number of vertical flues 60 and each pocket having an opening 74. The casting is also provided with a gas inlet connection 75 which opens into a gas heating chamber 75ᵃ surrounding the pockets 73.

Gas or similar fuel is adapted to be fed to the chamber 75ᵃ and air to support combustion is fed to the pockets 73 through the openings 74 in a manner which will hereinafter appear.

An oven section 76 (Figs. 4 and 10) is located below and connected to the above described section 71. This section 76 includes an inner annular wall 78 and an inner central portion 78ᵃ having a passage 77 therein which is aligned and communicates with the above mentioned spent gas duct 53. The passage 77 opens into laterally extending passages 82—82 as clearly shown in Figs. 4 and 10. The annular wall 78 encloses a central chamber 79 through which the coke is adapted to be moved. An outer annular wall 80 forms with the wall 78, an air chamber 81 within which air used for combustion is preheated. The chamber 81 includes a plurality of radially extending ribs or braces 81ª as shown in Fig. 10.

A flanged section 83 (Figs. 4 and 11) is secured to the section 76 and includes outer and inner annular walls 84 and 85 which enclose an air chamber 86. This chamber communicates by means of lateral ducts 89 with a central chamber 87 formed in an inner hub 88. Chambers 81 and 86 communicate with one another through an annular port 90.

As shown in Figs. 4, 12, 13, 14 and 15, below the section 83 there are a plurality of sections 91, 92, 93 and 94 of similar design and construction. These castings, as shown, have inner and outer cylindrical walls, inwardly sloping bottoms and open tops. Projecting upwardly from the sloping bottoms, there are a plurality of open top pockets 95, the walls of which serve as baffles for liquors adapted to be circulated through said sections. The inner walls 91ª, 92ª, 93ª and 94ª form part of a cooling chamber which communicates with the retorting chamber above. Some of the pockets 95 have side openings 96 or weirs formed therein. Within said pockets there are openings 97 which register with the downwardly projecting ducts 98.

Between the pockets 95, there are upwardly projecting ducts 99, each of which has a hood 100 supported in spaced relation thereto. Each hood, as shown, being of circular form and having a down turned flange. The lower portion of each flange is adapted to extend below the upper end of the duct 99 and to dip into the liquor. The lower edges of the flanges of the hoods will also preferably be serrated to form gas escape ports. The liquor in the sections 91, 92, 93 and 94 is adapted to absorb heat from the coke within the coke cooling chamber. This heat interchange causes the vaporization of some of the liquor and the vapors pass in a sinuous path to an outlet to be hereinafter referred to.

The section 91 has an outlet 102 which is connected with a pipe 28 leading to the decanter, thus when the liquor from the decanter reaches the level of the outlet pipe 26 therein it will flow by way of pipe 28 to the section 91 and follow a circuitous course in the heat exchange relationship with the walls 91ª, 92ª, 93ª and 94ª of the several sections which define part of the coke cooling chamber. The section 91 also has an outlet connection 101 which is connected by pipe 160 and T 161 to a saturator 159 adapted to receive vapors distilled off from the liquor in the several sections forming part of the coke cooling chamber. This saturator is connected by means of a pipe 162 with a suitable supply of sulphuric acid and to an acid over low pipe 165. The action of the sulphuric acid on the ammonia gas coming from the section 91 forms an ammonium sulphate by-product which collects in the elongated tube 163 which is closed at the end by removable plug 164. This product is adapted to be periodically discharged to a drain table 166 having gates 169 in the lower end thereof. After the product has been freed of any entrained moisture, the gates are opened and the product is discharged to the receivers 168 of housings 167 within which are mounted screw conveyors adapted to feed the ammonium sulphate to suitable storage receptacles.

Returning to the description of the oven structure, below the section 94 there are a plurality of castings 103, 104, 107 and 111 shown in plan in Figs. 16, 17, 18 and 19.

The section 103 has an outer wall as shown and an inner wall 103ª forming part of the coke cooling chamber. The sections 104, 107, and 111 have similar inner walls 104ª, 107ª and 111ª. A bottom section 116 has an inner circular wall 116ª located in alignment with the wall 111ª, and an inwardly tapering wall 116ᵇ forming chamber 127 adjacent a rotary coke discharge gate 137 carried by a shaft 138 rotatably mounted in suitable bearings formed in brackets 139. A bracket 141 carries a bearing 140 for the outer end of the shaft 138. Adjacent this bearing, the shaft carries a ratchet wheel 142 adapted to coact with the pawl 143 pivotally secured on a pin 144 carried by a pinion 145. Collars 146 and 147 prevent movement of shaft longitudinally. A rack 148 meshes with this pinion and is provided on its lower end with a depending shank which is guided in a bearing 150. An extension rod 149 secured to the rack is guided at its upper end within a bearing 151 formed in the bracket 152, said rod 149 being connected by a link 153 with the above mentioned lever 46 which as described previously is connected by link 45 with the piston actuated lever 43, at the top of the apparatus.

The sections 103 and 104 are somewhat similar to the sections 91, 92, 93 and 94 above described except that they have flat bottoms. These sections 103 and 104 are provided with upwardly projecting ducts 99 and hoods 100 the same as the sections above them. They are also provided with overflow ducts 105 as shown and with connected flanged openings 106. The downwardly extending duct 98 secured to the section 94 passes through the flanged openings 106 of the sections 103 and 104 and projects into the liquor contained in a section 107. This section is similar in all respects to the sections 103 and 104 except that a pocket 108 is provided in place of the flanged opening 106. This pocket has an overflow duct 109 which connects with a downwardly projecting duct 110, the lower end of which enters the liquor held within the chamber 117 of the vessel section 116. This vessel section has an intermediate wall 116ᶜ and a bottom wall 116ᵈ which, with the other walls shown, encloses a heating compartment 120 preferably lined with refractory material 120ª. The compartment 120 opens into an inlet fitting 121 which is connected with a pipe 154 provided at its upper end with a damper 155. This pipe 154 communicates with the spent gas passage 82 formed in the oven section 76 below the combustion chamber.

The heating compartment 120 has an outlet fitting 122 which connects with a fitting 173 communicating with a pipe 174 leading to a suitable stack not shown. The fitting 173 is connected with a steam generator 172 which communicates with the duct 82 of the section 76, a damper 156 being provided to control the volume of outgoing products of combustion from the spent gas duct 53. Steam generated is led to a steam drum 175 which is connected by suitable piping as shown with a steam header 176 adapted to lead to a steam engine or device for utilizing the steam generated.

Below the vessel section 116 there is a coke discharge section 130 having an inner conical shell 132 and an outer cylindrical supporting shell 131. The shell 132 encloses a coke discharge chamber or hopper 133 which is adapted to receive the material liberated by the rotary discharge gate 137.

Hopper 133 directs the material to an outlet chute 134 having a gate 135 pivoted thereto. The material discharged from the chute is received by a travelling conveyor belt 136 adapted to transport coke to a point of use or to a suitable storage bin.

In the production of coke according to this invention, steam, air or any similar motive fluid is admitted through pipe 37 to cylinder 29 thus lifting the piston 34. This lifts the ram 38 within the coal charging chamber and also rocks the lever 43 which through links 45 and 149, rack 148, pinion 145 and mechanism connected therewith rotates the gate 137. This results in removal of a predetermined amount of coke from the bottom of the coke cooling chamber. Steam, air or other motive fluid is then exhausted from the cylinder 29. This causes the piston to move downward and due to the coaction of the helically grooved member 42 and the pins 41 the ram 38 has a downward and rotary motion imparted thereto. This forces coal, which has previously been fed to the coal chamber 3, downwardly into the coking retort. The downward spiral-like stroke of the ram levels the coal in the charging chamber and compacts coke in the retort thus filling voids existing in either the retort coking chamber or the cooling chamber occasioned by the removal of material from the bottom. The forcible compacting of the coal and coke by the ram in the manner described is important because it contributes to the production of firm relatively non-porous coke suitable for metallurgical purposes.

The heat furnished by combustion of gases and air in the combustion chamber 58 surrounding the coking retort 56 causes the coal fed to the retort to be transformed to coke.

Gaseous fuel for heating the coking retort flows through the inlet fitting 75 of the section 71 and passes into the gas space 75ª between the air pockets 73 and around the central wall 72 which is in contact with the hot coke. Thus the gas is preheated and by this heat interchange a certain preliminary cooling of the coke is effected. The gas thus preheated passes through pipes 158 and openings 67 into the flues 60 of the combustion chamber where it mixes with the combustion air and burns.

The air for supporting combustion enters through an inlet opening 123 in the vessel section 116 and flows to the central chamber 124 within wall 125, braced by rib 126 and which communicates with the passage 129 formed in the air conduit 128, extending centrally through the coke cooling chamber. This coke cooling chamber is formed by the multiplicity of superimposed sections previously described. The incoming air absorbs heat from the coke in the chamber and thereby serves to cool the same. This air flows through the passages 89 and 90 of the section 83 to the chamber 81 and through openings 74 to air pockets 73 and thence by pipes 157 and openings 66 to the combustion chamber where it mixes with the gas supplied thereto. The outgoing products of combustion flow from annular chamber 50 at the top of the combustion chamber to the radial ports 49 and thence downwardly through the spent gas duct 53. Part of the spent products pass by way of the right hand duct 82 to the steam generator 172.

Another stream of spent gases flow by way of the passage 82 and pipe 154 to the heating chamber 120 formed in the vessel section 116. These gases give up their heat to the liquor in the chamber 117 of the vessel section and the gases are depleted of substantially all their reclaimable heat units. The spent gases pass outwardly through connection 122 and T 173 to the flue 174 leading to the stack.

The heat supplied by the combustion chamber surrounding the coking retort drives off valuable volatile products from the coal. Part of these gas products are withdrawn through the outlet pipes 13—13 by suitable gas exhausters not shown. Gases evolved from coal are rich in ammonia and in order to economically recover this, streams of water are impinged on the gases escaping from the ducts 17. The resulting ammonia liquor and condensed tar collect in the chamber 6 and flow by way of pipes 14 to the chamber 11 of the decanter that is formed by ring 7, shell 9 and bottom plate 10. In this decanter chamber, the tar being heavier settles at the bottom and it is either continuously or periodically removed through outlet nozzle 25 and pipe 27. The ammonia liquor being lighter rises to the top and escapes through outlet nozzle 26 and pipe 28 to the section 91. The liquor flows around this section and in intimate contact with the hot walls 91ª thereof and thus abstracts heat from the coke in the cooling chamber. Liquor from the section 91 escapes through the weir 96 into the pocket 95 and flows downwardly through opening 97 and duct 98 into the lower section 92. In a similar manner, the liquor from this section flows through weir 96, pocket 95 and duct 98 into the section 93 next below, thence in a similar manner through similar parts to the section 94.

From the section 94, the liquor flows through elongated duct 98 to the pocket 108 of section 107. From this section, the liquor flows through ducts 109 and 110 to chamber 117 of the vessel section 116. In passing through the sections 91, 92, 93 and 94 the liquor is compelled to circulate around the inner walls thereof and is compelled by walls of pockets 95 to flow through the narrow openings between the walls of the pockets and the inner walls of said sections, thus bringing the liquor into intimate heat exchanging relationship with the walls of the coke cooling chamber which holds hot incandescent coke. In this manner, the coke is cooled, the liquor is boiled and the volatile or free ammonia gas is driven from the liquor. This ammonia gas rises through the ducts 99 and passes under the hoods 100 and bubbles through the body of liquor of each section. Upon reaching the section 91, the ammonia gas flows by way of pipe 160 and fitting 161 to the saturator wherein it is mixed with sulphuric acid, thus producing crystalline ammonium sulphate which collects in the receiving pipe 163 as above described.

The liquor in circulating through the sections 91, 92, 93 and 94 has been freed of its volatile ammonia before it reaches the vessel chamber 117, but there is still an appreciable amount of fixed ammonia in the liquor which reaches this compartment. To recover this fixed ammonia, milk of lime is fed from a storage tank 170 by pipe 171 through opening 118 to the chamber 117. The milk of lime reacts with the liquor and frees the fixed ammonia therein. When released, this fixed ammonia gas rises through the ducts 112 and 113 and enters a chamber of the section 111. From this chamber it rises through ducts 99 and under hoods 100 and through the chambers in sections 107, 104 and 103 and into the chamber of section 94 and from thence on to the saturator 159 mingling with the ammonia gas liberated in the other sections from the liquor therein. The liquor freed entirely of its ammonia and the sludge or residue collected in the bottom of chamber 117 are drawn off from time to time as required through a suitable outlet opening 119. The ammonia gas freed from the liquor in chamber 117 carries with it a certain quantity of steam. This steam enters the chamber of section 111 along with the gas. In passing through the successive chambers of the sections 111, 107, 104 and 103 the gas is rectified and most of the steam is condensed. The condensate thus produced fills the troughs to the level of overflow ducts 105 (indicated in dotted lines in Fig. 4) and passes downwardly from the several sections into the section 111 and is maintained at the proper level by means of an adjustable overflow 115 secured to an outlet nozzle 114 connected with the section 111.

From the foregoing it will be clear that in making coke with my improved apparatus both the air and fuel used for the purpose of combustion are passed in heat exchanging relationship with the coke produced. The air travels through a duct which extends centrally through the cylindrical coke cooling chamber. In this way, the air is preheated and the temperature of the coke is materially reduced. The water used to absorb volatile products from the coal and coke is brought to heat exchanging relationship with the coke in the cooling chamber. In this manner, it will be understood that the finished coke is reduced to such a temperature that quenching thereof is unnecessary and the heat usually wasted in such quenching operations is utilized for both vaporizing the valuable products contained in the ammonia liquor and for preheating fuel and air. The products of combustion are also brought into heat exchanging relationship with the liquor containing fixed ammonia and finally to steam generators or heaters so as to further utilize the heat units of said spent gases.

While I have described the improved apparatus quite specifically it is not to be construed that I am limited thereto since various modifications may be made by those skilled in the art without departing from the invention as defined in the appended claims.

What I claim is:—

1. In a combined coke oven retort and distilling apparatus, a refractory structure defining an annular combustion chamber, an annular wall within said combustion chamber defining a coking chamber, a spent gas duct extending vertically through the coking chamber and communicating at its upper end with said annular combustion chamber, a coal charging unit above said refractory structure including a hopper surrounded by an annular vessel for holding a liquid, means for feeding coal to said hopper, means within the hopper for trapping the gases arising within said hopper, means within the hopper for condensing the trapped gases, means for leading the condensate to said annular vessel.

2. The apparatus of claim 1, including a plurality of sections for containing a liquid each including an annular wall constituting part of a coke cooling chamber adapted to receive coke from said coking chamber of claim 1, and means for conveying ammonia liquor from said vessel to one of said sections.

ZAREH H. KEVORKIAN.